United States Patent
Wang et al.

(10) Patent No.: US 10,338,283 B2
(45) Date of Patent: Jul. 2, 2019

(54) COMPOSITE GLUE COATING DEVICE AND PREPARATION METHOD FOR FANCY REFLECTIVE MATERIAL USING THE SAME

(71) Applicant: Hangzhou Chinastars Reflective Material Co., Ltd., Zhejiang (CN)

(72) Inventors: Shijie Wang, Zhejiang (CN); Weijiang Cha, Zhejiang (CN); Weican Jia, Zhejiang (CN); Bingnai Xie, Zhejiang (CN); Hai Ruan, Zhejiang (CN); Shanghuang Qiu, Zhejiang (CN); Wuewen Zhang, Zhejiang (CN); Xiaolin Liu, Zhejiang (CN); Xianwen Zhang, Zhejiang (CN); Guohong Cui, Zhejiang (CN)

(73) Assignee: Hangzhou Chinastars Reflective Material Co., Ltd., Zhejiang (CN)

( * ) Notice: Subject to any disclaimer, the term of this patent is extended or adjusted under 35 U.S.C. 154(b) by 283 days.

(21) Appl. No.: 15/328,061

(22) PCT Filed: Oct. 22, 2015

(86) PCT No.: PCT/CN2015/092519
§ 371 (c)(1),
(2) Date: Jan. 23, 2017

(87) PCT Pub. No.: WO2016/124010
PCT Pub. Date: Aug. 11, 2016

(65) Prior Publication Data
US 2017/0212284 A1    Jul. 27, 2017

(30) Foreign Application Priority Data

Feb. 5, 2015  (CN) .......................... 2015 1 0061492
Jun. 3, 2015  (CN) .......................... 2015 1 0299090
(Continued)

(51) Int. Cl.
*G02B 5/128* (2006.01)
*B05C 1/08* (2006.01)
(Continued)

(52) U.S. Cl.
CPC .............. *G02B 5/128* (2013.01); *B05C 1/003* (2013.01); *B05C 1/083* (2013.01); *B05C 1/0808* (2013.01);
(Continued)

(58) Field of Classification Search
USPC ....... 156/230, 231, 234, 237, 238, 240, 305, 156/307.1, 307.3, 308.2, 308.6, 384, 578
See application file for complete search history.

(56) References Cited

U.S. PATENT DOCUMENTS

| | | | |
|---|---|---|---|
| 5,474,827 A * | 12/1995 | Crandall | G02B 5/128 359/536 |
| 6,099,682 A * | 8/2000 | Krampe | B65D 75/5855 156/272.6 |

(Continued)

FOREIGN PATENT DOCUMENTS

| CN | 2261925 | 9/1997 |
|---|---|---|
| CN | 201378209 | 1/2010 |

(Continued)

OTHER PUBLICATIONS

Machine translation of CN 203697673 (Year: 2018).*
(Continued)

*Primary Examiner* — Sing P Chan
(74) *Attorney, Agent, or Firm* — JCIPRNET

(57) ABSTRACT

A composite glue coating device and a preparation method for a fancy reflective material using the same, which relates to the technical field of reflective material production. The composite glue coating device comprises a composite glue
(Continued)

roller (1), a glue coating roller (2), a glue sink device (3) and a glue scrapping device (4). The composite glue roller (1) and the glue coating roller (2) are arranged as a clamping roller set and a bead planting film passing interval (L) is formed between the composite glue roller (1) and the glue coating roller (2). The glue scrapping device (4) is connected with a scraper of the glue coating roller (2). A plurality of glue moving grooves (5) are evenly distributed on the glue coating roller (2). The glue coating roller (2) is connected with the glue sink device (3) and is glue immersed. The glue coating roller (2) rotates to transfer the glue (9) inside the glue sink device (3) into the glue moving grooves (5) and to coat the plating layer (13) of the bead planting film (6) with the glue (9) inside the glue moving grooves (5). The composite glue coating device can realize the batch production and the production efficiency is high. The reflective material produced has high tear resistance and comfort degree, with the fancy part being reflective and the rest as non-reflective. The reflective part has the same hand feeling with the rest substrate part, without obvious uneven feeling, and the reflective points are seamlessly connected with the substrate.

21 Claims, 13 Drawing Sheets

(30) Foreign Application Priority Data

| | | |
|---|---|---|
| Jun. 3, 2015 | (CN) | 2015 1 0299432 |
| Aug. 25, 2015 | (CN) | 2015 1 0523301 |
| Aug. 25, 2015 | (CN) | 2015 1 0524130 |
| Aug. 25, 2015 | (CN) | 2015 1 0526240 |
| Aug. 25, 2015 | (CN) | 2015 1 0527028 |

(51) Int. Cl.

| | |
|---|---|
| *B32B 5/02* | (2006.01) |
| *B32B 7/14* | (2006.01) |
| *B32B 27/06* | (2006.01) |
| *B32B 27/10* | (2006.01) |
| *B32B 27/12* | (2006.01) |
| *B32B 27/32* | (2006.01) |
| *B32B 27/00* | (2006.01) |
| *B32B 37/12* | (2006.01) |
| *B32B 37/15* | (2006.01) |
| *B32B 38/10* | (2006.01) |
| *B32B 38/18* | (2006.01) |
| *C08K 3/34* | (2006.01) |
| *C09J 5/00* | (2006.01) |
| *C09J 133/00* | (2006.01) |
| *C09J 175/04* | (2006.01) |
| *B05C 1/00* | (2006.01) |
| *B41F 16/00* | (2006.01) |
| *B32B 17/06* | (2006.01) |
| *B32B 7/12* | (2006.01) |
| *B32B 29/00* | (2006.01) |

(52) U.S. Cl.
CPC .......... *B05C 1/0817* (2013.01); *B05C 1/0834* (2013.01); *B32B 5/02* (2013.01); *B32B 7/12* (2013.01); *B32B 7/14* (2013.01); *B32B 17/06* (2013.01); *B32B 27/06* (2013.01); *B32B 27/10* (2013.01); *B32B 27/12* (2013.01); *B32B 27/32* (2013.01); *B32B 29/002* (2013.01); *B32B 37/1292* (2013.01); *B32B 37/15* (2013.01); *B32B 38/10* (2013.01); *B32B 38/18* (2013.01); *B41F 16/00* (2013.01); *C08K 3/34* (2013.01); *C09J 5/00* (2013.01); *C09J 133/00* (2013.01); *C09J 175/04* (2013.01); *B32B 2255/20* (2013.01); *B32B 2255/205* (2013.01); *B32B 2255/26* (2013.01); *B32B 2255/28* (2013.01); *B32B 2305/30* (2013.01); *B32B 2307/416* (2013.01); *B32B 2317/12* (2013.01); *B32B 2323/04* (2013.01); *B32B 2367/00* (2013.01); *B32B 2551/00* (2013.01); *C09J 2205/106* (2013.01); *C09J 2433/00* (2013.01); *C09J 2475/00* (2013.01)

(56) References Cited

U.S. PATENT DOCUMENTS

| | | | | |
|---|---|---|---|---|
| 6,681,828 | B1* | 1/2004 | Clough | B32B 38/0004 |
| | | | | 156/230 |
| 2006/0240230 | A1* | 10/2006 | Collins | B41M 3/006 |
| | | | | 428/195.1 |
| 2007/0231512 | A1* | 10/2007 | Lee | G02B 5/128 |
| | | | | 428/32.71 |
| 2011/0038048 | A1* | 2/2011 | Kobayashi | G02B 5/128 |
| | | | | 359/537 |
| 2016/0068726 | A1* | 3/2016 | Snyder | C09J 179/02 |
| | | | | 411/82.2 |

FOREIGN PATENT DOCUMENTS

| | | |
|---|---|---|
| CN | 203697673 | 7/2014 |
| CN | 203799038 | 8/2014 |
| CN | 104678470 | 6/2015 |
| CN | 204389724 | 6/2015 |
| CN | 104834039 | 8/2015 |
| CN | 103529504 | 10/2015 |

OTHER PUBLICATIONS

Machine translation of CN 203799038 (Year: 2018).*
"International Search Report (Form PCT/ISA/210)", dated Feb. 2, 2016, with English translation thereof, pp. 1-6.

* cited by examiner

COMPOSITE GLUE COATING DEVICE AND PREPARATION METHOD FOR FANCY REFLECTIVE MATERIAL USING THE SAME

CROSS-REFERENCE TO RELATED APPLICATION

This application is a 371 application of an International PCT application serial no. PCT/CN2015/092519, filed on Oct. 22, 2015, which claims the priority benefits of China Application No. 201510061492.X, filed on Feb. 5, 2015; China Application No. 201510299090.3, filed on Jun. 3, 2015; China Application No. 201510299432.1, filed on Jun. 3, 2015; China Application No. 201510527028.5, filed on Aug. 25, 2015; China Application No. 201510526240.X, filed on Aug. 25, 2015; China Application No. 201510524130.X, filed on Aug. 25, 2015; and China Application No. 201510523301.7, filed on Aug. 25, 2015. The entirety of each of the above-mentioned patent applications is hereby incorporated by reference herein and made a part of this specification.

TECHNICAL FIELD

The present invention relates to the technical field of the production of reflective materials, in particular to a composite glue coating device applied to the production process of the reflective materials and a preparation method for a fancy reflective material using the composite glue coating device.

BACKGROUND ART

Reflective cloth, also called as reflection cloth and regression reflection fabric, is characterized in that glass beads are applied to a fabric, and by applying the optical principle that light is regressed after refracted and reflected in the glass beads, most of the reflective light could return to the light source direction by following the incident light direction, and the reflective cloth is widely applied to the fields of traffic safety devices, uniforms, working suits, pasting films, protective suits and the like that are closely related to the life and property safety of humans. Such reflective material is made by an advanced process of processing after focusing, through using a regression reflection principle of the high-refractive index glass beads. It can reflect distant direct light back to a light emitting place, and has decent retroreflection optical performance in both the daytime and the night, and especially can realize a high visibility like that of daytime at night. By using the safety suits made of such reflective cloth with high visibility, a wearer can be easily found no matter in a distant place or under the condition of interference of backlight or scattering light, and the problem of "seeing" and "be seen" at night is smoothly solved due to emergence of the reflective material.

However, the traditional civil reflective material is single in color, only appears in grey and reflects light with a whole surface, does not have air permeability and sweat absorbing functions and can only be applied as a clothing design accessory. Therefore, it is of great value that a novel fancy reflective cloth product emerges, which has a reflection alarm function, and is novel in style, having various patterns and colors and can be directly used as a clothing fabric and processed into clothing.

CONTENT OF THE INVENTION

In order to solve the problems in a production process during the production of existing fancy reflective cloth, the present invention provides a composite glue coating device and a preparation method for a fancy reflective material using the same. The composite glue coating device can realize batch production, the production efficiency is high, the reflective material produced has high tear resistance and comfort degree, with fancy part being reflective and the rest as non-reflective, the reflective part has the same hand feeling with the rest substrate part, without obvious uneven feeling, and the reflective points are seamlessly connected with the substrate.

The present invention is realized by the following technical solution: a composite glue coating device comprises a composite glue roller, a glue coating roller, a glue sink device and a glue scrapping device; the composite glue roller and the glue coating roller are arranged as a clamping roller set and a bead planting film passing interval is formed between the composite glue roller and the glue coating roller, the glue scrapping device is connected with a scraper of the glue coating roller, a plurality of glue moving grooves are evenly distributed on the glue coating roller, the glue coating roller is connected with the glue sink device and is glue immersed, the glue coating roller rotates to transfer the glue inside the glue sink device into the glue moving grooves, and to coat the plating layer of the bead planting film with the glue inside the glue moving grooves.

The composite glue coating device is most suitably applied in the production process of the reflective material. Through the composite glue coating device, local glue coating on the bead planting film of a whole page can be realized. That is, the part of the bead planting film making contact with the glue moving grooves on the glue coating roller in a film moving process realizes glue coating, while the bead planting film making contact with other parts of a roller surface of the glue coating roller has no glue. In this way, fancy glue coating of the bead planting film can be realized. According to the requirements of a fancy design on the bead planting film, the glue moving grooves are set into a required geometric shape, thus in the glue coating process, the glue in the glue moving grooves is coupled with the bead planting film in the geometric shape of the glue moving grooves to form a fancy composite glue bead planting film with a required geometric shape. When the fancy composite glue bead planting film is coupled with a substrate in the next process to form a fancy reflective material semiproduct, the fancy reflective material semiproduct is finally peeled by a peeling device. Since a gluing force of a fancy part coated with the composite glue is larger, when the composite film is peeled, glass beads at the glue part and the substrate are firmly glued together, while the glass beads at the part without coating the glue are peeled together with the composite film. Finally, the glass beads left on the substrate present a fancy structure in the geometric shape of the glue moving grooves, such that the reflective part on the material presents a fancy structure and the fancy reflective material is obtained. To the composite glue coating device, the substrate can be air permeable or air impermeable, while the reflective glass beads are remained by local fancy glue coating, with the fancy part being reflective and the rest as non-reflective. This kind of structure could enable the peeled glass beads to be repeatedly used, and can also be directly used twice to make a material with the fancy part being non-reflective and the rest as reflective. The production efficiency is high and two different reflective materials can be produced by a single production. In addition, the reflective points are seamlessly connected with the substrate, the reflective part has the same hand feeling with the rest substrate part, without obvious uneven feeling, the manufacturing is simple, and the reflective material produced has a high tear resistance and high comfort degree, and can realize batch production.

A heating temperature range of the glue coating roller is 0° C.~150° C., the glue sink device comprises a glue sink, the glue sink is disposed below the glue coating roller, the lower roller surface of the glue coating roller is immersed in the glue of the glue sink, and a heating temperature range of the glue sink is 0° C.~180° C.

Preferably, when a heating glue coating roller is selected as the glue coating roller, a heating temperature range of the glue coating roller is controlled at 70° C.~150° C. The glue sink device comprises a glue tank and a glue sink, the glue tank is disposed above the glue sink and is connected with the glue sink by a conveying pipe, and the glue tank is a heating tank. A heating temperature of the glue tank is controlled at 70° C.~180° C. and is used for heating solid glue into liquid to realize the requirement of a glue transfer quantity and to convey the heated glue liquid into the glue sink. And the glue sink connects to the glue liquid of the glue coating roller, when the roller surface of the glue coating roller rotates to the position of the glue sink, the glue moving groove on the roller surface is filled with the glue liquid, and then rotated to the bead planting film to be coupled with the same. It is ensured that the gluing force of the fancy glue coating part in the subsequent process is larger than a peeling force, and the glass beads and the substrate are firmly glued.

Preferably, the glue coating roller is a fancy roller, the glue transfer quantity of the glue coating roller is 200 g/m²~250 g/m², and is selected in a matching manner according to the particle size of the glass beads, and the glue and the plating layer have a coupling temperature of 0-140° C., a coupling pressure of 0.01 MPa-5 MPa, and a coating speed of 3-30 m/min. No matter the heated glue coating roller or the normal temperature glue coating roller is used, the fancy glue moving grooves in different geometric shapes can be disposed on the glue coating roller to realize reflection of the patterns of different geometric shapes on the final fancy material. Direct batch production is realized and the material is processed into clothing, helmets, luminous products, name cards, etc. The glue transfer quantity of the glue coating roller is matched with the particle size of the glass beads, the large particle size requires a higher transfer quantity, while the small particle size requires a relatively low transfer quantity. Of course, both of them need to meet the requirement that the gluing force is larger than the peeling force.

Preferably, the glue coating roller is a fancy intaglio roller, a depth H of the glue moving grooves on the fancy intaglio roller is 0.06~045 mm, and the glue transfer quantity of the glue moving grooves is controlled at 50%~95% according to a solid content of the glue or glue viscosity, wherein a trapezoid arc bottom structure is selected as the structure of the glue moving grooves. Patterns such as an English letter, a Chinese character, a dot pattern, a five-pointed star pattern, flower and bird patterns and the like can be selected as the geometric shape of the glue moving grooves, and the geometric shape of the glue moving grooves decides the fancy shape of the reflective part, i.e., the fancy structure. A radius R of the intaglio roller is 100±10 mm, and a groove bottom radius of the glue moving grooves is R1=R—H.

The glue scrapping device is disposed in opposite or same direction with the rotating direction of the glue coating roller, the glue scrapping device is a glue scrapping disk, a glue scrapping plate or a glue scrapping blade, a tangent plane included angle between the glue scrapping device and the roller surface of the glue coating roller is a=15±1°, and a full width line pressure of the glue scrapping device is 8~17 kg/m. Except for the glue in the glue moving grooves, the glue scrapping device removes the glue on the glue coating roller surface.

Preferably, the glue scrapping device is a double-scraper structure, a front scrapper is disposed in a certain position in front of a glue transfer position and plays a role of scrapping excessive glue on the roller surface of the glue coating roller into the glue sink device, and thus realizes that the glue only exists in the glue moving grooves and does not exist in any other places. At this point, the glue scrapping device is disposed in same direction with the rotating direction of the glue coating roller, and a tangent plane included angle between the glue scrapping device and the roller surface of the glue coating roller is a=15±1°. The rear scraper is disposed in a certain position behind the glue transfer position and plays a role of cutting off drawing glue, and thus ensures that a graph edge of the glue moving grooves is transferred clearly. At this point, the glue scrapping device is disposed in opposite direction with the rotating direction of the glue coating roller, and a tangent plane included angle between the glue scrapping device and the roller surface of the glue coating roller is a=15±1°.

A shore hardness HS of the composite glue roller is 38±1 degrees, and the surface hardness of the composite glue roller is one of the important factors influencing the glue transfer quantity and the glue transfer clearness.

The above geometric shape is the designed pattern, comprising required graphs, fonts, etc.

The composite glue coating device is connected to a composite device, a peeling part and a winding auxiliary device through a drying path, thereby forming a composite coating system.

According to a preparation method for a fancy reflective material by using the above composite glue coating device, the obtained fancy reflective material comprises a substrate, a glue layer, a plating layer, a focusing layer and glass beads. A glue layer with a geometric shape is disposed between the substrate and the plating layer. The glue layer is realized by a composite glue coating device. The focusing layer is disposed on the plating layer, and the glass beads are disposed on the focusing layer. The above geometric shape is the designed pattern, comprising required graphs, fonts and the like.

The thickness of the glue layer is 30 μm-500 μm, the thickness of the plating layer is 0.1 nm-100 nm, the thickness of the focusing layer is 0.1 μm-5 μm, the range of a refractive index of the glass beads is 1.91-2.2, and the range of the particle size of the glass beads is 20-80 μm.

The above preparation method for a fancy reflective material has the following steps:

1) Planting glass beads: the glass beads are placed on a PE composite film, and are then placed in a heating roller at a temperature of 140-220° C., along with melting of the PE composite film, the glass beads are deposited on the PE composite film, after the PE composite film is cooled, the glass beads are fixed on the PE composite film, thereby plants the glass beads.

Preferably, the PE composite film is selected from one of PE/PET composite film and PE/paper composite film.

2) The surfaces of the glass beads in step 1) are coated with a focusing coating, and then dried into a focusing layer.

The focusing coating is made by mixing the following components in parts by weight: 60 parts of main body adhesive, 1-9 parts of curing agent, 0-5 parts of auxiliary, 10-200 parts of diluent, and 0-5 parts of color filler.

Wherein, the adhesive is selected from one of solvent type acrylic resin, solvent type polyurethane resin, waterborne acrylic resin, and waterborne polyurethane resin; the curing agent is selected from one or more of isocyanate curing agent, aziridine curing agent, and amino resin curing agent, the isocyanate curing agent is selected from one of commercially available Bayer N-75, Bayer N-3390, and Bayer L-75, and the amino resin curing agent is selected from one of methoxylated amino resin and butoxylated amino resin; the auxiliary is selected from one or more of wetting agent, dispersant, and coupling agent, and the coupling agent is selected from one or more of silane coupling agent KH-550, KH-560, KH-570, and KH-572; the diluent is selected from one or more of ethyl acetate, toluene, butanone, butyl acetate, dimethylbenzene, cyclohexanone and water; the color filler is selected from one or more of aluminum powder, aluminum paste, color powder, color paste, calcium carbonate, kaolin, titanium dioxide, silicon dioxide, and luminous powder, and the color powder and color paste are selected from one or more of red, blue, green, black, white, yellow, purple and the like.

3) Plating: a plating medium is converted into gas from solid through a resistance heating manner and then deposited into a plating layer outside the focusing layer after meeting the focusing layer, thereby forms the bead planting film.

The plating layer is one of a metal plating layer, a transparent plating layer, and a semitransparent plating layer. The metal plating layer is selected from one or more of a metal titanium plating layer, a metal titanium plating layer, and a metal silver plating layer, formed by plating aluminum, titanium, or silver as a medium, and the transparent plating layer is selected from one or more of a transparent planting layer formed by plating zinc sulfide, kryocide, silicon monoxide, silicon dioxide, or indium oxide as a medium; and the semitransparent plating layer is formed by plating titanium nitride as a medium.

4) The glue layer is roller-coated outside the plating layer in a geometric shape through the composite glue coating device, thereby forms bead planting film with a fancy glue layer.

The glue of the glue layer is prepared by mixing the following components in parts by weight: 60-70 parts of main resin, 0-9 parts of curing agent, 0-20 parts of flame retardant, 0-10 parts of auxiliary, 0-30 parts of diluent, and 0-30 parts of color filler; wherein, the main resin is selected from one or more of copolyester, copolyamide, ethylene and its copolymer, ethylene acrylic copolymer, styrene and its segmented copolymer, thermoplastic polyurethane hot melt adhesive, reaction type polyurethane hot melt adhesive, thermoplastic acrylate solvent type acrylic resin, solvent type polyurethane resin, waterborne acrylic resin, and waterborne polyurethane resin; the curing agent is selected from one or more of isocyanate curing agent, aziridine curing agent, and amino resin curing agent, the isocyanate curing agent is selected from one of commercially available Bayer N-75, Bayer N-3390, and Bayer L-75, and the amino resin curing agent is selected from one of methoxylated amino resin and butoxylated amino resin; the flame retardant is selected from one or more of phosphorus based flame retardant, nitrogen based flame retardant, phosphorus-nitrogen based flame retardant, and bromine flame retardant; the auxiliary is selected from one or more of wetting agent, dispersant, coupling agent, and anti-drawing auxiliary, and the coupling agent is selected from one or more of commercially available silane coupling agent KH-550, KH-560, KH-570, and KH-572; the diluent is selected from one or more of ethyl acetate, toluene, butanone, butyl acetate, dimethylbenzene, cyclohexanone, and water; the color filler is selected from one or more of aluminum powder, aluminum paste, color powder, color paste, calcium carbonate, kaolin, titanium dioxide, silicon dioxide, and luminous powder, and the color powder and color paste are selected from one or more of red, blue, green, black, white, yellow, purple and the like.

The glue of the glue layer can be selected from normal temperature liquid glue and heated solid glue, the heated solid glue can increase a thickness of the glue layer and enhances a gluing strength between the glue layer and the substrate, and the prepared product is superior to the normal temperature liquid glue in wear resistance, scrapping resistance and water washing resistance. Preferably, the glue layer of the heated solid glue has various forms and has a large selection range, such that a selection range of the particle sizes of the glass beads is also large, the reflectance is thus increased. That is, an initial retroreflection coefficient is high, and is more than 500 cd/(lx·m$^2$), and the reflective pattern may be changed along with the pattern change of the glue layer. Meanwhile, the heated solid glue can be repeatedly used, cost is saved, the manufacturing process is also changed along with the property of a glue film, and can be adaptive to various substrates, including paper and blister sheets.

The coating method comprises: the bead planting film in step 3) is unwound to the composite glue coating device through a guide roller, such that the bead planting film passes through a bead planting film passing interval between the composite glue roller and the glue coating roller, the glue coating roller rotates to fill the glue moving grooves with the glue, the glue coating roller rotates to drive the glue moving groove filled with the glue to be coupled with the plating layer of the bead planting film passing the bead planting film passing interval, the glue in the glue moving groove is transferred to the bead planting film to realize glue coating coupling, thereby finishing a dynamic glue moving coupling and coating, in a rotating process of the glue coating roller, the glue scrapping device is used to scrap excessive glue on the roller surface of the glue coating roller, and the bead planting film with a fancy glue layer is formed.

5) The bead planting film with the fancy glue layer is passed through the composite coating system to obtain the fancy reflective material.

The bead planting film with the fancy glue layer is coupled with the substrate through a drying path at the composite device, then the PE composite film is peeled at the peeling part to obtain a fancy reflective material which is wound by a winding auxiliary device.

The glue layer and the substrate have a coupling temperature of 0-140° C., a coupling pressure of 0.01 MPa-5 MPa, and a coating speed of 3-30 m/min.

Preferably, the substrate is selected from chemical fiber cloth, TC cloth, elastic cloth, oxford cloth, PU leather, leather, PVC leather, warp knitting cloth, bird eye fabric, nylon fabric, polyester taffeta, chiffon, functional textile, paper, blister sheet, luminous base material, etc., wherein the functional textile is selected from self-inflaming retarding fabric, luminous fabric, waterproof fabric, antistatic fabric, antiradiation fabric, fleece fabric, antibiosis deodorized fabric, thermal insulation fabric, heat accumulation fabric, bamboo carbon fiber fabric, anion aroma fabric, germanium fiber fabric, anti-enzyme antibiosis fabric, pearl fiber fabric, hygroscopic and sweat releasing fabric, warm keeping fabric, air conditioning fiber fabric, easy-to-care fabric, etc.

Since the PE composite film has a releasing effect, a bonding force between the PE and the glass beads is poorer, while the bonding force between the beads and the substrate through the glue is larger. When the PE composite film is peeled, the glass beads without glue are also removed by the PE composite film, and local glass beads with the glue will be left on the substrate to form the fancy reflective material. Preferably, the remaining PE composite film is peeled, the PE composite film or plating layer is coated with glue, the glue is again coupled with the substrate after dried, and after the coupling glue is totally cured, the PE composite film is peeled to form the air impermeable fancy reflective material. The periphery of a fancy pattern of the air impermeable fancy reflective material is light reflective and plays an alarm role, and since the material is air impermeable, it is windproof and waterproof and can be taken as outdoor cloth.

Compared with the prior art, the present invention has the beneficial effects:

(1) The fancy reflective cloth produced by the process of the present invention is wide full page coating, is clear in pattern, and can be produced in batch.

(2) The preparation method of the present invention has a simple device, is high in production efficiency, and a whole operation environment is cleaner.

DESCRIPTION OF THE EMBODIMENTS

The technical solution of the present invention is described in detail through specific embodiments in combination with drawings, and raw materials in the embodiments are all commercially available, and are expressed in parts by weight.

Embodiment 1

Figure 1:
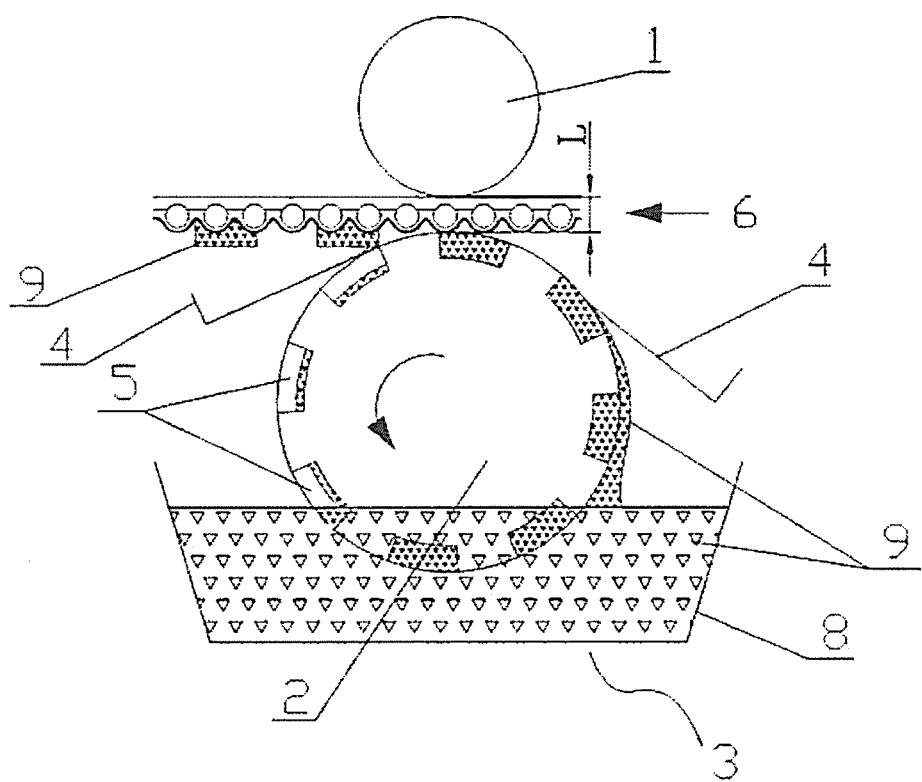
FIG. 1 is a structural schematic diagram of a composite glue coating device of the present invention.

The composite glue coating device as shown in FIG. 1 comprises a glue roller 1, a glue coating roller 2, a glue sink device 3 and a glue scrapping device 4; the composite glue roller 1 and the glue coating roller 2 are arranged up and down and a bead planting film passing interval L is formed between the composite glue roller 1 and the glue coating roller 2; the glue scrapping device 4 is connected with a scraper of the glue coating roller 2; a plurality of glue moving grooves 5 are evenly distributed on the glue coating roller 2; the glue coating roller 2 is immersed in the glue of the glue sink device 3 in a glue passing manner; the glue coating roller 2 rotates to transfer the glue inside the glue sink device 3 into the glue moving grooves 5, the glue scrapping device 4 scraps excessive glue 9 on the roller surface of the glue coating roller 2 into the glue sink device 3, and the glue coating roller 2 rotates to coat the plating layer 13 of the bead planting film 6 with the glue inside the glue moving grooves 5.

The glue coating roller 2 is a heating glue coating roller, a shore hardness HS of the composite glue roller 1 is 38±1 degrees. The glue sink device 3 comprises a glue sink 8, and the glue sink 8 is disposed below the glue coating roller 2, and the lower roller surface of the glue coating roller 2 is immersed in the glue of the glue sink 8.

Figure 2:
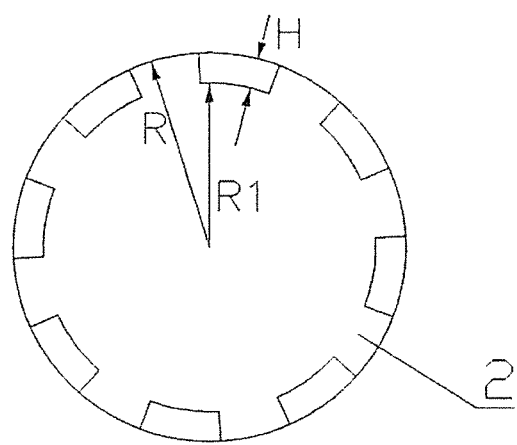
FIG. 2 is a structure schematic diagram of a glue coating roller in the composite glue coating device.

The glue coating roller is a fancy roller, a glue transfer quantity of the glue coating roller is 200 g/m$^2$~250 g/m$^2$, and is selected in a matching manner according to the particle size of the glass beads. The glue coating roller 2 is an intaglio roller, a depth H of the glue moving grooves 5 on the glue coating roller 2 is 0.06~0.45 mm, and the glue transfer quantity of the glue moving grooves 5 is controlled at 50%~95% according to a solid content of the glue or glue viscosity. The glue coating roller 2 can adopt an intaglio roller structure, the depth H of the glue moving grooves 5 is preferably 0.06~0.45 mm, a radius R of the intaglio roller is 100±10 mm, and a groove bottom radius of the glue moving grooves is R1=R—H, as shown in FIG. 2. A trapezoid arc bottom structure is selected as the structure of the glue moving grooves, patterns such as an English letter, a Chinese character, a dot pattern, a five-pointed star pattern, flower and bird patterns and the like can be selected as the geometric shape of the glue moving grooves, and the geometric shape of the glue moving grooves decides the fancy shape of the reflective part, i.e., the fancy structure.

Figure 3:
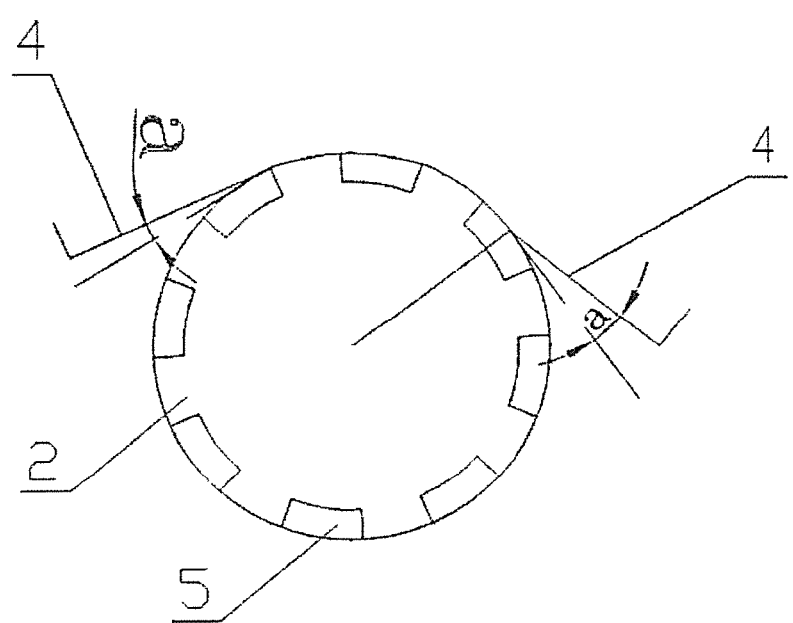
FIG. 3 is a structure schematic diagram of a glue scrapping device and the glue coating roller in the composite glue coating device.
Figure 4:
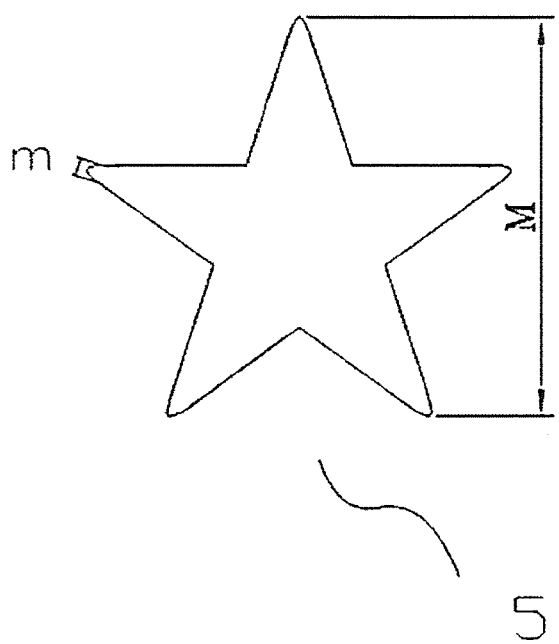
FIG. 4 is a structure schematic diagram of a glue moving groove of the glue coating roller in the composite glue coating device.

In the present embodiment, the glue moving grooves 5 adopt five-pointed star grooves, as shown in FIG. 4, the depth of the glue moving grooves is preferably 0.4±0.04 mm, and a graphic size has a smallest size of m≥1 mm and a largest width≤5 cm. The glue scrapping device 4 in the embodiment is a glue scrapping plate, the glue scrapping device 4 is structured as a double scraper structure. The glue scrapping device 4 that is disposed at the point in which the glue moving grooves 5 is moving away from the glue sink 8 is disposed in same direction with the rotating direction of the glue coating roller 2, a tangent plane included angle between the glue scrapping device 4 and the roller surface of the glue coating roller 2 is a=15°, as shown in FIG. 3, and a full width line pressure of the glue scrapping device 4 is 15±2 kg/m. The glue scrapping device 4 that is disposed at the point in which the glue moving grooves is moving away from the bead planting film that is after glue moving is disposed in opposite direction with the rotating direction of the glue coating roller 2, and a tangent plane included angle between the glue scrapping device and the roller surface of the glue coating roller is a=15°.

Embodiment 2

The technical solution in embodiment 1 is basically same as that of embodiment 2, and the difference is that: the glue scrapping device 4 is a glue scrapping blade, the glue scrapping device 4 is structured as a double scraper structure. The glue scrapping device 4 that is disposed at the point in which the glue moving grooves 5 is moving away from the glue sink 8 is disposed in same direction with the rotating direction of the glue coating roller 2, a tangent plane included angle between the glue scrapping device 4 and the roller surface of the glue coating roller 2 is a=15°, as shown in FIG. 3, and a full width line pressure of the glue scrapping device 4 is 15±2 kg/m. The glue scrapping device 4 that is disposed at the point in which the glue moving groove is moving away from the bead planting film that is after glue moving is disposed in opposite direction with the rotating direction of the glue coating roller 2, and a tangent plane included angle between the glue scrapping device and the roller surface of the glue coating roller is a=15°.

Embodiment 3

The technical solution in embodiment 3 is basically same as that of embodiment 1, and the difference is the selection of parameters: a shore hardness of the composite glue roller is 38 degrees, the a angle is 16°, the full width scraper line pressure is 15 kg/m, the depth of the fancy groove is 0.3 mm, and the fancy geometric pattern is dots.

Embodiment 4

The technical solution in embodiment 4 is basically same as that of embodiment 1, and the difference is the selection of parameters: a shore hardness of the composite glue roller is 38 degrees, the a angle is 15.5°, the full width scraper line pressure is 16 kg/m, the depth of the fancy groove is 0.38 mm, and the fancy geometric pattern is oval.

Embodiment 5

The technical solution in embodiment 5 is basically same as that of embodiment 1, and the difference is the selection of parameters: a shore hardness of the composite glue roller is 38 degrees, the a angle is 14.5°, the full width scraper line pressure is 17 kg/m, the depth of the fancy groove is 0.42 mm, and the fancy geometric pattern is English letters.

Embodiment 6

The technical solution in embodiment 6 is basically same as that of embodiment 1, and the difference is the selection of parameters: a shore hardness of the composite glue roller is 38 degrees, the a angle is 14.5°, the full width scraper line pressure is 17 kg/m, the depth of the fancy groove is 0.42 mm, and the fancy geometric pattern is Chinese characters.

Embodiment 7

Figure 5:
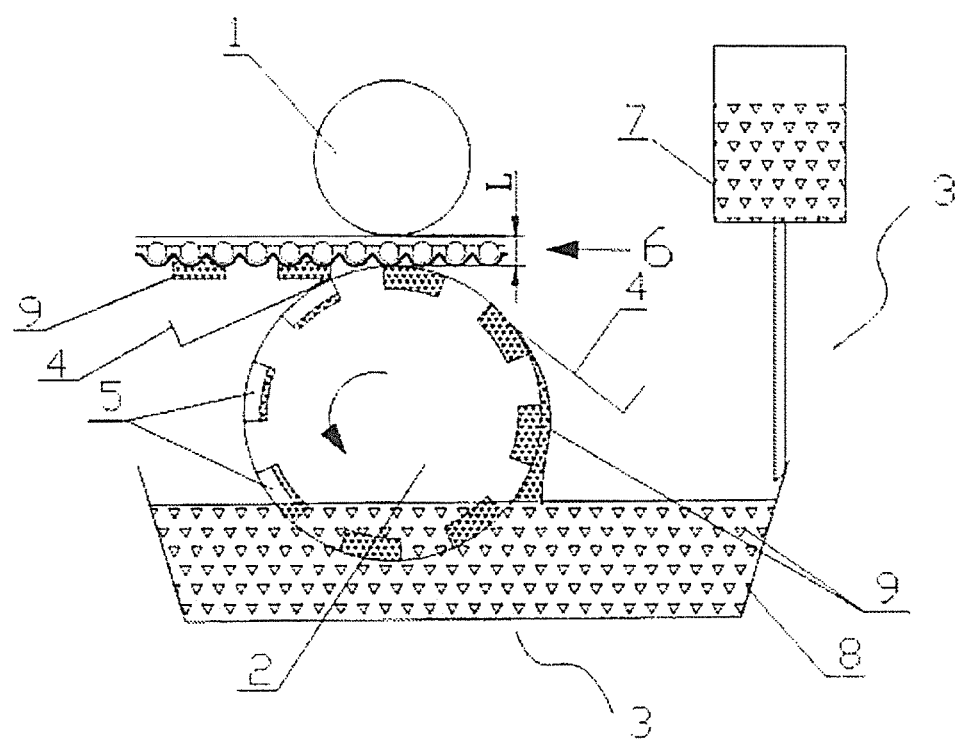
FIG. 5 is a second structural schematic diagram of the composite glue coating device of the present invention.

The composite glue coating device as shown in FIG. 5 comprises a composite glue roller 1, a glue coating roller 2, a glue sink device 3 and a glue scrapping device 4, a share hardness HS of the composite glue roller is 38±1 degrees, the composite glue roller 1 and the glue coating roller 2 are arranged up and down and a bead planting film passing interval L is formed between the composite glue roller 1 and the glue coating roller 2; the glue scrapping device 4 is connected with a scraper of the glue coating roller 2; a plurality of glue moving grooves 5 are evenly distributed on the glue coating roller 2; the glue coating roller 2 is immersed in the glue of the glue sink device 3 in a glue passing manner; the glue coating roller 2 rotates to transfer the glue inside the glue sink device 3 into the glue moving grooves 5, the glue scrapping device 4 scraps excessive glue 9 on the roller surface of the glue coating roller 2 into the glue sink device 3, and the glue coating roller 2 rotates to coat the plating layer 13 of the bead planting film 6 with the glue inside the glue moving grooves 5.

The glue coating roller 2 is a heating glue coating roller, and a heating temperature range of the glue coating roller 2 is 70° C.~150° C. In the present embodiment, a heating temperature of the glue coating roller 2 is 70° C. The glue sink device 3 comprises a glue tank 7 and a glue sink 8, the glue tank 7 is vertically disposed above the glue sink 8 and is connected with the glue sink 8 by a conveying pipe, and the glue tank 7 is a heating tank. The heating temperature of the glue sink and the glue tank is controlled at 70° C.

The glue coating roller 2 is a fancy roller, and a glue transfer quantity of the glue coating roller 2 is 200 g/m²~250 g/m², and is selected in a matching manner according to the particle size of the glass beads. The glue coating roller can be a fancy intaglio roller, a depth H of the glue moving grooves 5 on the glue coating roller 2 is 0.06~0.45 mm, and the glue transfer quantity of the glue moving grooves 5 is controlled at 50%~95% according to a solid content of the glue or glue viscosity. A radius R of the intaglio roller is 100±10 mm, and a groove bottom radius of the glue moving grooves is R1=R—H, as shown in FIG. 2. When the glue coating roller 2 is a fancy intaglio roller structure, a trapezoid arc bottom structure is selected as the structure of the glue moving grooves, patterns such as an English letter, a Chinese character, a dot pattern, a five-pointed star pattern, flower and bird patterns and the like can be selected as the geometric shape of the glue moving grooves, and the geometric shape of the glue moving grooves decides the fancy shape of the reflective part, i.e., the fancy structure.

In the present embodiment, the glue moving grooves 5 adopts a trapezoid arc bottom structure, and its depth H is 0.06 mm. In the present embodiment, the glue scrapping device 4 is disposed in opposite or same direction with the rotating direction of the glue coating roller 2, a full width line pressure of the glue scrapping device 4 is 8 kg/m, the glue scrapping device 4 adopts a double-scraper structure, the glue scrapping device 4 is a glue scrapping blade, and the dual scraper structures are disposed respectively at the point in which the glue moving groove is moving away from the glue sink, and at the point in which the glue moving groove is moving away from the bead planting film that is after glue moving. A tangent plane included angle between the glue scrapping device 4 disposed at the point in which the glue moving groove is moving away from the glue sink and the roller surface of the glue coating roller 2 is a=14°, as shown in FIG. 3, the glue drawing can be cut off, and it is ensured that a graph edge of the glue moving grooves is transferred clearly. An acute angle included angle between the glue scrapping device disposed at the point in which the glue moving groove is moving away from the bead planting film that is after glue moving and the roller surface of the glue coating roller is a=14°, the glue not completely transferred in the glue moving grooves is scrapped back into the glue moving grooves for use the next time, and the clearness of the glue coating shape edge of the glue moving grooves and the bead planting film is also ensured.

Embodiment 8

The technical solution in embodiment 8 is basically the same as that in embodiment 7, and the difference is that the glue coating roller 2 is a fancy intaglio roller, the heating temperature of the glue coating roller 2 is 100° C., the heating temperature of the glue tank is controlled at 150° C., the glue moving groove 5 is arc groove structure, and its depth H can be 0.3 mm. A full width line pressure of the glue scrapping device 4 is 10 kg/m, the glue scrapping device 4 is a double-scraper structure. The glue scrapping device 4 that is disposed at the point in which the glue moving grooves 5 is moving away from the glue tank 8 is disposed in opposite direction with the rotating direction of the glue coating roller 2, so as to cut off the glue drawing and ensure that a graph edge of the glue moving grooves 5 is transferred clearly. And an acute angle included angle between the glue scrapping device 4 that is disposed at the point in which the glue moving grooves is moving away from the bead planting film that is after glue moving and the roller surface of the glue coating roller is a=14°, the glue not completely transferred in the glue moving grooves is scrapped back into the glue moving grooves for use the next time, and the clearness of the glue coating shape edge of the glue moving grooves and the bead planting film is also ensured.

Embodiment 9

The technical solution in embodiment 9 is basically same as that of embodiment 7, and the difference is various parameters and shapes: a shore hardness of the composite glue roller is 38 degrees, the a angle is 15°, the full width scraper line pressure is 12 kg/m, a heating temperature of the glue sink and the glue tank 7 is 160° C., the fancy roller is an intaglio roller, the heating temperature is 140° C., the depth of the fancy groove is 0.2 mm, and the fancy geometric pattern is dots.

Embodiment 10

The technical solution in embodiment 10 is basically same as that of embodiment 7, and the difference is various parameters and shapes: a shore hardness of the composite glue roller is 38.5 degrees, the a angle is 15.5°, the full width scraper line pressure is 11 kg/m, a heating temperature of the glue sink and the glue tank 7 is 140° C., the fancy roller is an intaglio roller, the heating temperature is 130° C., the depth of the fancy groove is 0.15 mm, and the fancy geometric pattern is English letters.

Embodiment 11

The technical solution in embodiment 11 is basically same as that of embodiment 7, and the difference is various parameters and shapes: a shore hardness of the composite glue roller is 37.5 degrees, the a angle is 14.5°, the full width scraper line pressure is 12 kg/m, a heating temperature of the glue sink and the glue tank 7 is 130° C., the fancy roller is an intaglio roller, the heating temperature is 120° C., the depth of the fancy groove is 0.25 mm, and the fancy geometric pattern is dots.

Application Example 1

Figure 13:
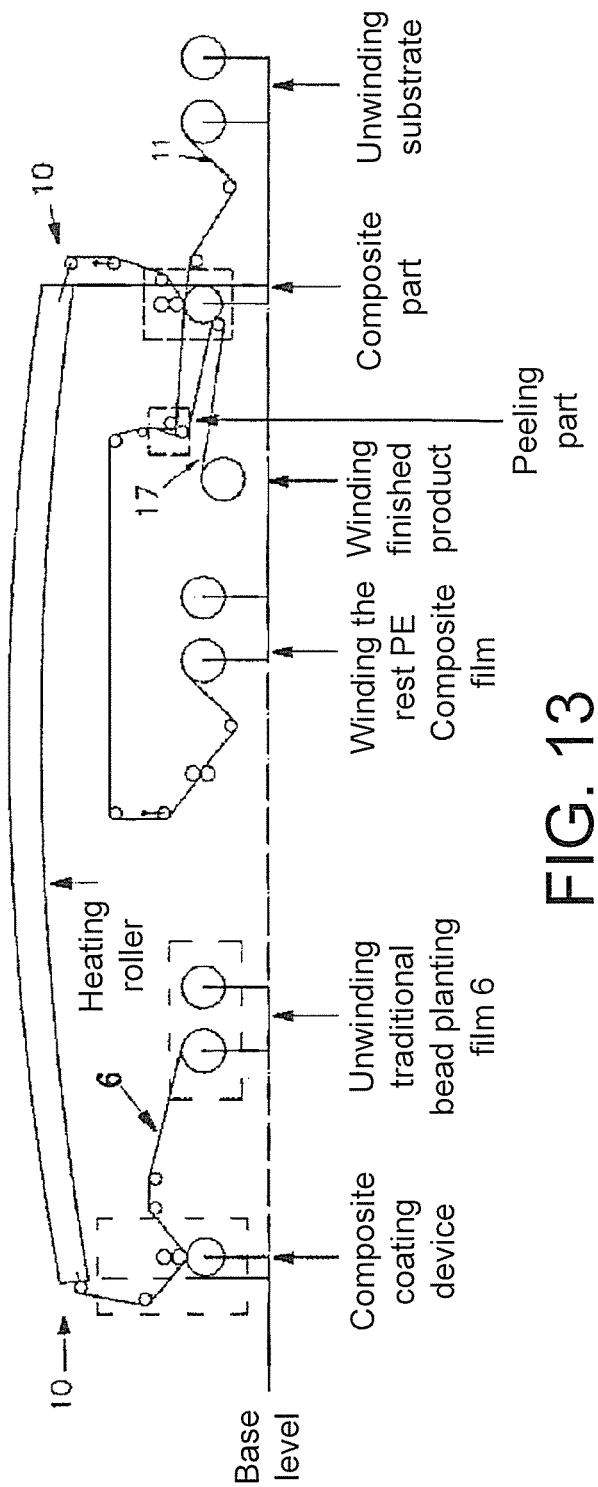
FIG. 13 is a process flow chart of the composite glue coating device in preparation of the fancy reflective material of the present invention.

The process flow of realizing the preparation method for a fancy reflective material by using the composite coating system is shown in FIG. 13:
1) Planting glass beads: the glass beads 15 of which a refractive index is 1.91 and a particle size is 20 μm are placed on a PE/PET composite film 16, and are then placed in a heating roller at a temperature of 140° C., along with melting of the PE composite film, the glass beads 15 are deposited on the PE composite film, after the PE composite film is cooled, the glass beads 15 are fixed on the PE/PET composite film, thereby plants the glass beads 15.
2) The surfaces of the glass beads 15 in step 1) are coated with a focusing coating sharing the same sphere center with the glass beads 15, then a solvent is dried to form a focusing layer 14 through an oven, and a thickness of the focusing layer 14 is 0.1 μm.

The focusing coating is prepared by mixing 60 parts of solvent type acrylic resin, 2 parts of commercially available Bayer-N-75, 2 parts of silane coupling agent KH-550, and 150 parts of butanone.

Figure 8:
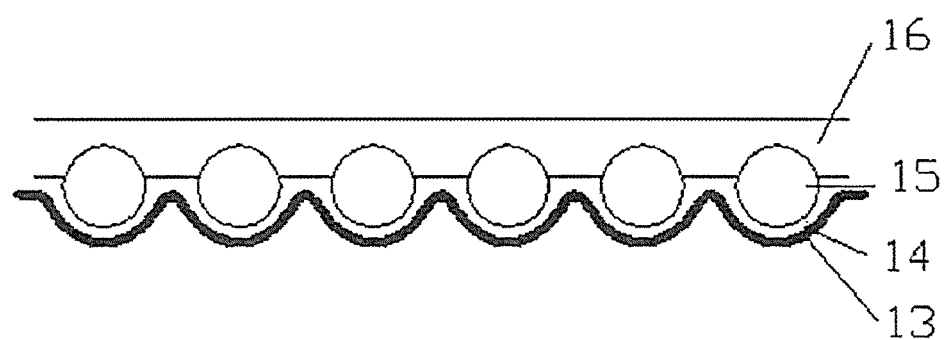
FIG. 8 is a structural schematic diagram of a bead planting film of the present invention.

3) Plating: an aluminium medium is converted into gas from solid through a resistance heating manner and then deposited into a metal plating layer 13 outside the focusing layer 14 after meeting the focusing layer 14, a thickness of the plating layer is 8 nm, and a bead planting film 6 as prepared is shown in FIG. 8.

4) The glue 9 is roller-coated outside the plating layer of the bead planting film 6 in a fancy pattern through the composite glue coating device of embodiment 1 to form a fancy glue layer 12, and a thickness of the glue layer 12 is 50 μm.

The glue coating method is: the bead planting film 6 formed in step 3) is unwound to the composite glue coating device through a guide roller, such that the bead planting film 6 passes through the bead planting film passing interval between the composite glue roller 1 and the glue coating roller 2, the glue coating roller 2 rotates to fill the glue moving grooves 5 with the glue 9, the glue coating roller rotates to drive the glue moving groove 5 filled with the glue 9 to be coupled with the plating layer 13 of the bead planting film passing the bead planting film passing interval L, the glue 9 in the glue moving groove 5 is transferred to the bead planting film 6 to realize glue coating coupling, thereby finishing a dynamic glue moving coupling and coating, in a rotating process of the glue coating roller, the glue scrapping device 4 is used to scrap excessive glue on the roller surface of the glue coating roller 2, and the bead planting film with a fancy glue layer is formed. The depth of the fancy groove is 0.4 mm, the coupling temperature is 70° C., the coupling pressure is 2.5 MPa, a coating speed is 16 m/min, and the fancy pattern is a five-pointed star shape.

Figure 6:
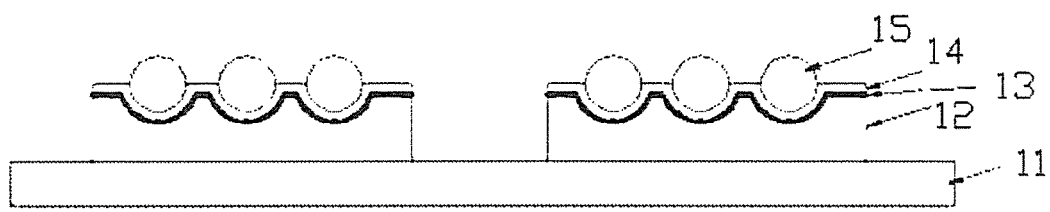
FIG. 6 is a structural schematic diagram of a fancy reflective material of the present invention.
Figure 7:
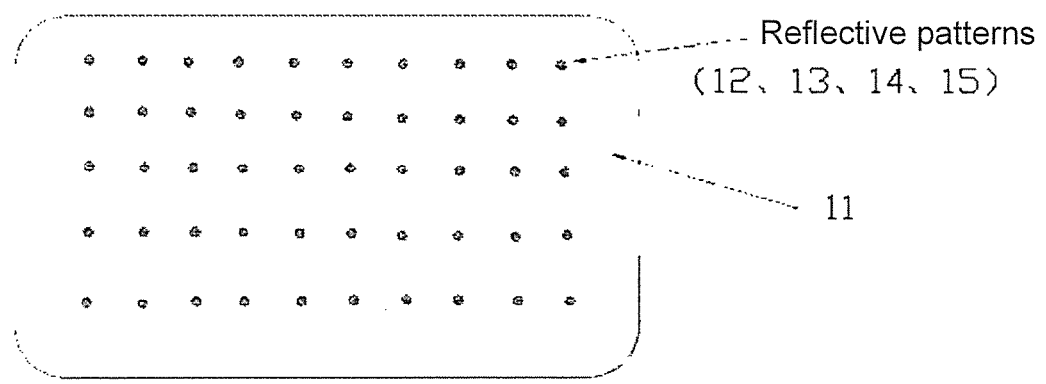
FIG. 7 is a planar schematic diagram of a fancy reflective material of the present invention.
Figure 9:
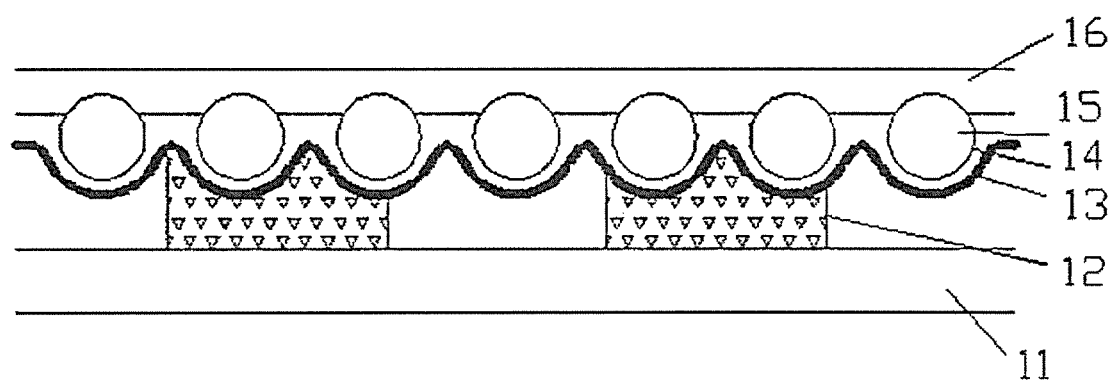
FIG. 9 is a structural schematic diagram of a fancy reflective material with a PE composite film.
Figure 10:
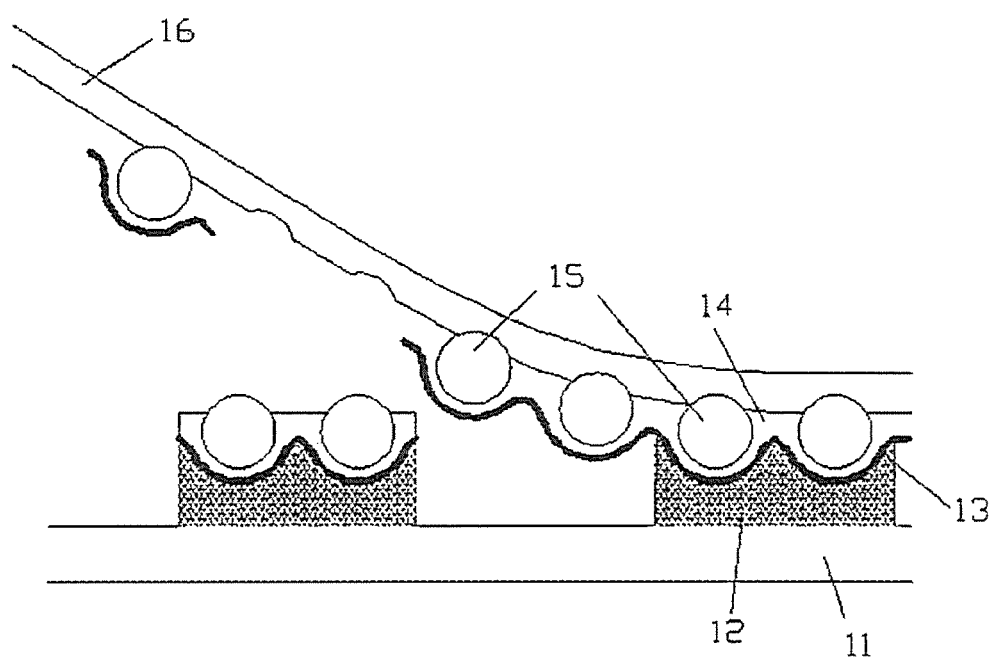
FIG. 10 is a structural schematic diagram of a fancy reflective material from which the PE composite film is being peeled.

5) The glue layer 12 is coupled with pure cotton cloth 1 at the composite device through a drying path, as shown in FIG. 9. The coupling temperature is 50° C., a coupling pressure is 0.01 MPa, and a coating speed is 3 m/min. After the glue 9 is cured, as shown in FIG. 10, the PE/PET composite film 16 is peeled on the peeling part to obtain fancy reflective cloth 1, a structural schematic diagram is shown in FIG. 6, a planar schematic diagram is shown in FIG. 7, and winding is performed by a winding auxiliary device.

Figure 11:
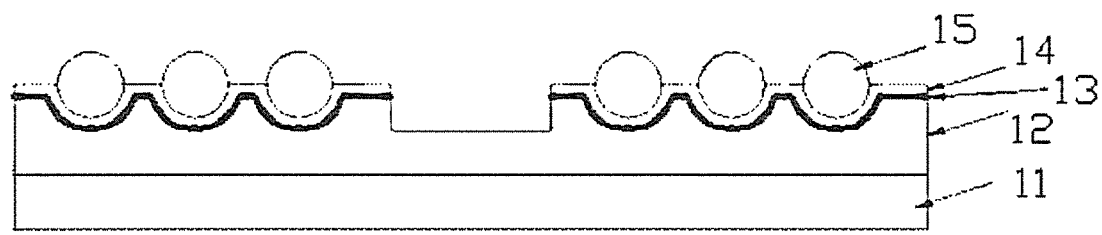
FIG. 11 is a structural schematic diagram of an air impermeable fancy reflective material of the present invention.
Figure 12:
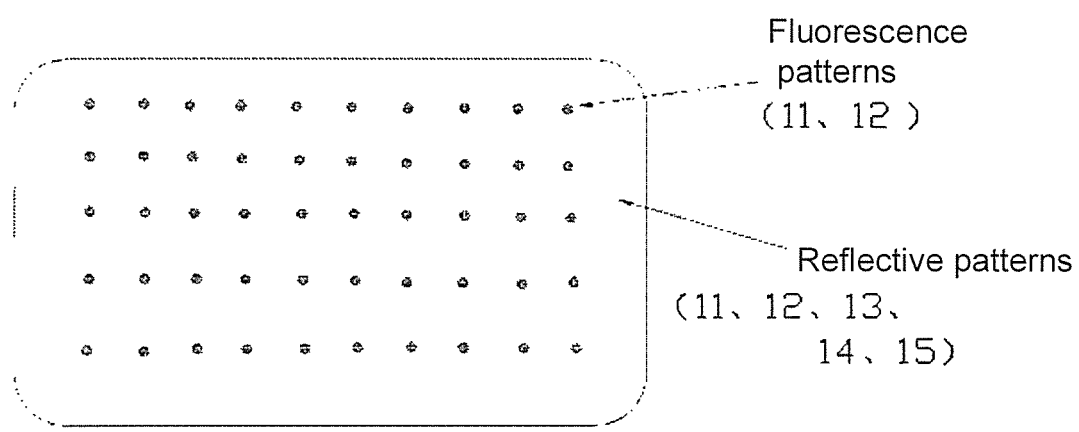
FIG. 12 is a planar schematic diagram of an air impermeable fancy reflective material of the present invention.

6) The rest PE/PET composite film 16 after peeling in step 5) and the plating layer 13 are coated with the glue 9, a thickness of the glue 9 is 50 μm. After dried, the composite glue and the pure cotton cloth 11 are coupled, a coupling temperature is 50° C., a coupling pressure is 0.01 MPa, a coating speed is 3 m/min, and after the composite glue 9 is totally cured, the PE composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 60 parts of solvent type acrylic resin, 2 parts of commercially available Bayer N-75, 1 part of commercially available silane coupling agent KH-560, 15 parts of butanone and 2 parts of red paste.

Application Example 2

The process flow of realizing the preparation method for a fancy reflective material by using the composite coating system is shown in FIG. 13:

1) Planting glass beads: the glass beads 15 of which a refractive index is 2.2 and a particle size is 80 μm are placed on a PE/paper composite film 16, and are then placed in a heating roller at a temperature of 220° C., along with melting of the PE composite film, the glass beads 15 are deposited on the PE/paper composite film, after the PE/paper composite film is cooled, the glass beads 15 are fixed on the PE/paper composite film, thereby plants the glass beads 15.

2) The surfaces of the glass beads 15 in step 1) are coated with a focusing coating sharing the same sphere center with the glass beads 15, then a solvent is dried to form a focusing layer 14 through an oven, and a thickness of the focusing layer 14 is 5 μm;

The focusing coating is prepared by mixing 60 parts of solvent type polyurethane resin, 9 parts of aziridine curing agent, 4 parts of silane coupling agent KH-560, 1 part of commercially available wetting agent, 200 parts of ethyl acetate, and 5 parts of kaolin.

3) Plating: an indium oxide medium is converted into gas from solid through a resistance heating manner and then deposited into a transparent plating layer 13 outside the focusing layer 14 after meeting the focusing layer 14, a thickness of the plating layer 13 is 0.1 nm, and a bead planting film as prepared is shown in FIG. 8.

4) The glue 9 is roller-coated outside the plating layer of the bead planting film 6 in a fancy pattern through the composite glue coating device of embodiment 2 to form a fancy glue layer 12, and a thickness of the glue layer 12 is 500 μm.

The intaglio roller coating method of the composite glue coating device is the same as the Application example 1, the differences are: the glue scrapping device 4 is a glue scrapping blade, the glue scrapping device 4 is structured as a single scraper, the glue scrapping device 4 is disposed at the point in which the glue moving grooves 5 is moving away from the glue tank 8, the glue scrapping device 4 is disposed in same direction with the rotating direction of the glue coating roller 2, an acute angle included angle between the glue scrapping device 4 and the roller surface of the glue coating roller 2 is a=15±1°, a full width line pressure of the glue scrapping device 4 is 15±2 kg/m.

5) The glue layer 12 is coupled with black oxford cloth 1 at the composite device through a drying path, the coupling temperature is 90° C., a coupling pressure is 0.8 MPa, a coating speed is 22 m/min, after the glue 9 is cured, the PE/PET composite film 16 is peeled on the peeling part to obtain a fancy reflective cloth 17. The structural schematic diagram is shown in FIG. 6, the planar schematic diagram is as shown in FIG. 7, and winding is performed by a winding auxiliary device.

6) The rest PE/paper composite film 16 after peeling in step 5) and the plating layer 13 are coated with the glue, a thickness of the glue 9 is 500 μm. After dried, the composite glue and the black oxford cloth 1 are coupled, a coupling temperature is 90° C., a coupling pressure is 0.8 MPa, a coating speed is 22 m/min, and after the composite glue is totally cured, the PE/paper composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 60 parts of solvent type polyurethane resin, 5 parts of aziridine curing agent, 10 parts of ethyl acetate, and 3 parts of kaolin.

Application Example 3

The process flow of realizing the preparation method for a fancy reflective material by using the composite coating system is shown in FIG. 13:

1) Planting glass beads: the glass beads 15 of which a refractive index is 1.94 and a particle size is 50 μm are placed on a PE/PET composite film 16, and are then placed in a heating roller at a temperature of 180° C., along with melting of the PE/PET composite film, the glass beads 15 are deposited on the PE composite film, after the PE composite film is cooled, the glass beads 15 are fixed on the PE/PET composite film, thereby plants the glass beads 15.

2) The surfaces of the glass beads 15 in step 1) are coated with a focusing coating sharing the same sphere center with the glass beads 15, then a solvent is dried to form a focusing layer 14 through an oven, and a thickness of the focusing layer 14 is 3 μm.

The focusing coating is prepared by mixing 60 parts of solvent type acrylic resin, 5 parts of methoxylated amino resin, and 10 parts of water.

3) Plating: a titanium nitride medium is converted into gas from solid through a resistance heating manner and then deposited into a semitransparent plating layer 13 outside the focusing layer 14 after meeting the focusing layer 14, a thickness of the plating layer is 100 nm, and a bead planting film 6 as prepared is shown in FIG. 8.

4) The glue 9 is roller-coated outside the plating layer of the bead planting film 6 in a fancy pattern through the composite glue coating device of embodiment 3 to form a fancy glue layer 12, and a thickness of the glue layer 12 is 220 μm.

The intaglio roller coating method of the composite glue coating device is the same as the Application example 1, the differences are: a shore hardness of the composite glue roller is 38 degrees, the a angle is 15°, the full width scraper line pressure is 15 kg/m, the depth of the fancy groove is 0.3 mm, and the fancy geometric pattern is dots.

5) The glue layer 12 is coupled with PU leather 11 at the composite device through a drying path, the coupling temperature is 140° C., a coupling pressure is 5 MPa, a coating speed is 30 m/min, after the glue 9 is cured, the PE/PET composite film 16 is peeled on the peeling part to obtain fancy reflective cloth 17, a structural schematic diagram is shown in FIG. 6, a planar schematic diagram is shown in FIG. 7, and winding is performed by a winding auxiliary device.

6) The rest PE/paper composite film 16 after peeling in step 5) and the plating layer 13 are coated with the glue, a thickness of the glue 9 is 220 μm. After dried, the composite glue and the PU leather are coupled, a coupling temperature is 140° C., a coupling pressure is 5 MPa, a coating speed is 30 m/min, and after the composite glue is totally cured, the composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 60 parts of solvent type acrylic resin, 5 parts of methoxylated amino resin, 1 part of commercially available dispersant, 2 parts of silane coupling agent KH-572, 30 parts of toluene, and 20 parts of luminous powder.

Application Example 4

The process flow of realizing the preparation method for a fancy reflective material by using the composite coating system is shown in FIG. 13:

1) Planting glass beads: the glass beads 15 of which a refractive index is 1.91 and a particle size is 20 μm are placed on a PE/PET composite film 16, and are then placed in a heating roller at a temperature of 140° C., along with melting of the PE composite film, the glass beads 15 are deposited on the PE composite film, after the PE composite film is cooled, the glass beads 15 are fixed on the PE/PET composite film, thereby plants the glass beads 15.

2) The surfaces of the glass beads 15 in step 1) are coated with a focusing coating sharing the same sphere center with the glass beads 15, then a solvent is dried into a focusing layer 14 through an oven, and a thickness of the focusing layer 14 is 0.1 μm.

The focusing coating is prepared by mixing 60 parts of solvent type acrylic resin, 2 parts of commercially available Bayer N-75, 5 parts of silane coupling agent KH-550, and 150 parts of butanone.

3) Plating: an aluminium medium is converted into gas from solid through a resistance heating manner and then deposited into a metal plating layer 13 outside the focusing layer 14 after meeting the focusing layer 14; a thickness of the plating layer 13 is 8 nm, and a bead planting film 6 as prepared is shown in FIG. 8.

4) The glue 9 is roller-coated outside the plating layer 13 of the bead planting film 6 in a dotted pattern through the composite glue coating device of embodiment 7 to form a fancy glue layer 12, a bead planting film with a five-pointed star shape glue layer 12 is formed, and a thickness of the glue layer 12 is 50 μm.

The intaglio roller coating method of the composite glue coating device is: a heating temperature of the glue coating roller 2 is 70° C., the glue sink device 3 comprises a glue tank 7 and a glue sink 8, the glue tank 7 is vertically disposed above the glue sink 8 and is connected with the glue groove 8 by a conveying pipe, and the glue tank 7 is a heating tank. The heating temperature of the glue sink and the glue tank is controlled at 70° C., as shown in FIG. 5, the bead planting film 6 forming in step 3) is unwound to the composite glue coating device through a guide roller, such that the bead planting film 6 passes through the bead planting film passing interval between the composite glue roller 1 and the glue coating roller 2, the glue tank 7 heats the glue 9 into a fluid, which flows into the glue sink 8. The glue coating roller 2 rotates to fill the glue moving grooves 5 with the glue 9, the glue coating roller rotates to drive the glue moving groove 5 filled with the glue 9 to be coupled with the plating layer 13 of the bead planting film passing the bead planting film passing interval L, the glue 9 in the glue moving groove 5 is transferred to the bead planting film 6 to realize glue coating coupling, thereby finishing a dynamic glue moving coupling and coating, in a rotating process of the glue coating roller, the glue scrapping device 4 is used to scrap excessive glue on the roller surface of the glue coating roller 2, and the bead planting film with a fancy glue layer is formed. The depth of the fancy groove is 0.4 mm, the coupling temperature is 70° C., the coupling pressure is 2.5 MPa, a coating speed is 16 m/min, and the fancy pattern is a five-pointed star pattern.

5) The glue layer 12 is coupled with pure cotton cloth 11 at the composite device through a drying path, as shown in FIG. 9. The coupling temperature is 50° C., a coupling pressure is 0.01 MPa, a coating speed is 30 m/min, after the glue 9 is cured, as shown in FIG. 10, the PE/PET composite film 16 is peeled on the peeling part to obtain fancy reflective cloth 17, a structural schematic diagram is shown in FIG. 6, a planar schematic diagram is shown in FIG. 7, and winding is performed by a winding auxiliary device.

6) The rest PE/PET composite film 16 after peeling in step 5) and the plating layer 13 are coated with the glue, a thickness of the glue 9 is 220 μm. After dried, the composite glue and the PU leather are coupled, a coupling temperature is 50° C., a coupling pressure is 0.01 MPa, a coating speed is 3 m/min. After the glue 9 is totally cured, the composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 70 parts of copolyamide, 20 parts of decabromodiphenyl ethane, and 3 parts of silicon dioxide.

Application Example 5

The process flow of realizing the preparation method for a fancy reflective material by using the composite coating system is shown in FIG. 13:

1) Planting glass beads: the glass beads 15 of which a refractive index is 2.2 and a particle size is 80 μm are placed on a PE/paper composite film 16, and are then placed in a heating roller at a temperature of 220° C., along with melting of the PE composite film, the glass beads 15 are deposited on the PE/paper composite film, after the PE/paper composite film is cooled, the glass beads 15 are fixed on the PE/paper composite film, thereby plants the glass beads 15.

2) The surfaces of the glass beads 15 in step 1) are coated with a focusing coating sharing the same sphere center with the glass beads 15, then a solvent is dried to form a focusing layer 14 through an oven, and a thickness of the focusing layer 14 is 5 μm.

The focusing coating is prepared by mixing 60 parts of solvent type polyurethane resin, 9 parts of aziridine curing agent, 1 part of silane coupling agent KH-572, 1 part of commercially available wetting agent, 200 parts of ethyl acetate, and 5 parts of kaolin.

3) Plating: an indium oxide medium is converted into gas from solid through a resistance heating manner and then deposited into a transparent plating layer 13 outside the focusing layer 14 after meeting the focusing layer 14, a thickness of the plating layer 13 is 0.1 nm, and a bead planting film 6 as prepared is shown in FIG. 80

4) The glue 9 is roller-coated outside the plating layer of the bead planting film 6 in a dotted pattern through the composite glue coating device of embodiment 10 to form a fancy glue layer 12, and a thickness of the glue layer 12 is 500 μm.

The roller coating method of the composite glue coating device is the same as the Application example 4, as shown in FIG. 5, the differences are: the shore hardness of the composite glue roller 1 is 38 degrees, the a angle is 80°, a full width scraper line pressure is 12 kg/m, a heating temperature of the glue sink and glue tank 7 is 160° C., the fancy roller is an intaglio roller, a heating temperature is 140° C., the depth of the fancy groove is 0.2 mm, and the fancy geometric pattern is dots.

5) The glue layer 12 is coupled with black oxford cloth 11 at the composite device through a drying path, as shown in FIG. 9. The coupling temperature is 90° C., a coupling pressure is 0.8 MPa, a coating speed is 22 m/min. After the glue 9 is cured, as shown in FIG. 10, the PE/PET composite film 16 is peeled on the peeling part to obtain fancy reflective cloth 17, a structural schematic diagram is shown in FIG. 6, a planar schematic diagram is shown in FIG. 7, and winding is performed by a winding auxiliary device.

6) The rest PE/PET composite film 16 after peeling in step 5) and the plating layer 13 are coated with the glue, a thickness of the glue 9 is 220 μm. After dried, the composite glue and the black oxford cloth 1 are coupled, a coupling temperature is 90° C., a coupling pressure is 0.8 MPa, a coating speed is 22 m/min. After the glue 9 is totally cured, the PE/paper composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 70 parts of ethylene acrylic copolymer and 5 parts of kaolin.

Application Example 6

The process flow of realizing the preparation method for a fancy reflective material by using the composite coating system is shown in FIG. 13:

1) Planting glass beads: the glass beads 15 of which a refractive index is 1.94 and a particle size is 50 μm are placed on a PE/PET composite film 16, and are then placed in a heating roller at a temperature of 180° C., along with melting of the PE/PET composite film, the glass beads 15 are deposited on the PE composite film, after the PE composite film is cooled, the glass beads 15 are fixed on the PE/PET composite film, thereby plants the glass beads 15.

2) The surfaces of the glass beads 15 in step 1) are coated with a focusing coating sharing the same sphere center with the glass beads 15, then a solvent is dried to form a focusing layer 14 through an oven, and a thickness of the focusing layer 14 is 3 μm.

The focusing coating is prepared by mixing 60 parts of solvent type acrylic resin, 5 parts of methoxylated amino resin, 10 parts of toluene, and 3 parts of silicon dioxide, and the auxiliary is 1 part of commercially available silane coupling agent KH-560.

3) Plating: a titanium nitride medium is converted into gas from solid through a resistance heating manner and then deposited into a semitransparent plating layer 13 outside the focusing layer 14 after meeting the focusing layer 14, a thickness of the plating layer is 100 nm, and a bead planting film 6 as prepared is shown in FIG. 8;

4) The glue 9 is roller-coated outside the plating layer of the bead planting film 6 in a dotted pattern through the composite glue coating device of embodiment 12 to form a fancy glue layer 12, and a thickness of the glue layer 12 is 220 μm.

The roller coating method of the composite glue coating device is the same as the Application example 4, as shown in FIG. 5, the differences are: that the shore hardness of the composite glue roller 1 is 37.5 degrees, the a angle is 72°, a full width scraper line pressure is 12 kg/m, a heating temperature of the glue sink and glue tank 7 is 130° C., the fancy roller is an intaglio roller, a heating temperature is 120° C., the depth of the fancy groove is 0.25 mm, and the fancy geometric pattern is dots.

5) The glue layer 12 is coupled with TO leather 11 at the composite device through a drying path, as shown in FIG. 9, the coupling temperature is 140° C., a coupling pressure is 5 MPa, a coating speed is 30 m/min, after the glue 9 is cured, as shown in FIG. 10, the PE/PET composite film 16 is peeled on the peeling part to obtain fancy reflective cloth 17, a structural schematic diagram is shown in FIG. 6, a planar schematic diagram is shown in FIG. 7, and winding is performed by a winding auxiliary device.

6) The rest PE/paper composite film 16 after peeling in step 5) and the plating layer 13 are coated with the glue, a thickness of the glue 9 is 220 μm. After dried, the composite glue and the PU leather are coupled, a coupling temperature is 140° C., a coupling pressure is 5 MPa, a coating speed is 30 m/min, and after the glue 9 is totally cured, the composite film 16 is peeled to form the air impermeable fancy reflective cloth; a structural schematic diagram is shown in FIG. 11, a planar schematic diagram is shown in FIG. 12, and winding is performed by a winding auxiliary device.

The glue is prepared by mixing 70 parts of thermoplastic polyurethane hot melt adhesive, 10 parts of melamine, and 30 parts of luminous powder.

TEST EXAMPLES

The fancy reflective materials 1-6 prepared by the application examples 1-6 are compared with B (fancy reflective cloth by performing screen printing on a traditional bead planting film for multiple times to transfer the glue and then coupling with base cloth) and C (fancy reflective cloth by performing mechanical scribing on a reflection hot paster and then coupling with base cloth), and the result is shown in Table 1:

TABLE 1

|  | A | B | C |
| --- | --- | --- | --- |
| Production efficiency | Very high | Low | Low |
| Production cost | Low | High | High |
| Hand feeling of the reflective part and the rest base cloth part | Consistent, without obvious uneven feeling | Obvious uneven feeling | |
| Continuity of reflective points | Continuous without seams | Seams | No seams |

An initial retroreflection coefficient of the wide air permeable fancy reflective material can be made by more than 500 cd/(lx·m$^2$).

What is claimed is:
1. A composite glue coating device comprising:
   a composite glue roller;
   a glue coating roller;
   a glue sink device; and
   a glue scrapping device, wherein the composite glue roller and the glue coating roller are arranged as a clamping roller set and a bead planting film passing interval is formed between the composite glue roller and the glue coating roller, the glue scrapping device is connected with a scraper of the glue coating roller, a plurality of glue moving grooves are evenly distributed on the glue coating roller, the glue coating roller is connected with the glue sink device and is glue immersed, the glue coating roller rotates to transfer the glue inside the glue sink device into the glue moving grooves, and to coat the plating layer of the bead planting film with the glue inside the glue moving grooves;

wherein a tangent plane included angle between the glue scrapping device and the roller surface of the glue coating roller is a=15±1°.

2. The composite glue coating device according to claim 1, wherein a heating temperature range of the glue coating roller is 0° C.~150° C., the glue sink device comprises a glue sink, the glue sink is disposed below the glue coating roller and the lower roller surface of the glue coating roller is immersed in a glue in the glue sink, and a heating temperature range of the glue sink is 0° C.~180° C.

3. The composite glue coating device according to claim 1, wherein the glue coating roller is a fancy intaglio roller, a glue transfer quantity of the glue coating roller is 200 g/m²~250 g/m², and the glue and the plating layer have a coupling temperature of 0-140° C., a coupling pressure of 0.01 MPa-5 MPa, and a coating speed of 3-30 m/min.

4. The composite glue coating device according to claim 3, wherein the glue coating roller is a fancy roller, a depth H of the glue moving grooves on the fancy intaglio roller is 0.06~0.45 mm, and the glue transfer quantity of the glue moving grooves is controlled at 50%~95% according to a solid content of the glue or glue viscosity.

5. The composite glue coating device according to claim 1, wherein the glue scrapping device is disposed in opposite or same direction with the rotating direction of the glue coating roller, the glue scrapping device is a glue scrapping disk, a glue scrapping plate or a glue scrapping blade, and a full width line pressure of the glue scrapping device is 8~17 kg/m.

6. The composite glue coating device according to claim 1, wherein the composite glue coating device is connected to a composite device, a peeling part, and a winding auxiliary device through a drying path, thereby forming a composite coating system.

7. A preparation method for a fancy reflective material, comprising:
1) planting glass beads: the glass beads are placed on a polyethylene composite film, and are then placed in a heating roller at a temperature of 140-220° C., along with the melting of the polyethylene composite film, the glass beads are deposited on the polyethylene composite film, after the polyethylene composite film is cooled, the glass beads are fixed on the polyethylene composite film, thereby plants the glass beads;
2) surfaces of the glass beads in step 1) are coated with a focusing coating, and then dried into a focusing layer;
3) plating: a plating medium forms a plating layer outside the focusing layer through a resistance heating manner, thereby forms a bead planting film;
4) a glue layer is roller-coated outside the plating layer in a geometric shape through a composite glue coating device, thereby forms the bead planting film with a fancy glue layer; and
5) the bead planting film with the fancy glue layer is passed through the composite coating system to obtain the fancy reflective material,
wherein the focusing coating is made by mixing components as follows in parts by weight: 60 parts of a main body adhesive, 1-9 parts of a curing agent, 0-5 parts of an auxiliary, 10-200 parts of a diluent, and 0-5 parts of a color filler, wherein:
the main body adhesive is selected from one of solvent type acrylic resin, solvent type polyurethane resin, waterborne acrylic resin, and waterborne polyurethane resin;
the curing agent is selected from one or more of isocyanate curing agent, aziridine curing agent, and amino resin curing agent;
the auxiliary is selected from one or more of wetting agent, dispersant, and coupling agent;
the diluent is selected from one or more of ethyl acetate, toluene, butanone, butyl acetate, dimethylbenzene, cyclohexanone, and water; and
the color filler is selected from one or more of aluminum powder, aluminum paste, color powder, color paste, calcium carbonate, kaolin, titanium dioxide, silicon dioxide, and luminous powder.

8. The preparation method for a fancy reflective material according to claim 7, wherein the glue layer with a geometric shape is disposed between the substrate and the plating layer, the glue layer is realized by the composite glue coating device, the focusing layer is disposed on the plating layer, and the glass beads are disposed on the focusing layer.

9. The preparation method for a fancy reflective material according to claim 7, wherein the composite glue coating device comprises a composite glue roller, a glue coating roller, a glue sink device and a glue scrapping device, the composite glue roller and the glue coating roller are arranged as a clamping roller set and a bead planting film passing interval is formed between the composite glue roller and the glue coating roller, the glue scrapping device is connected with a scraper of the glue coating roller, a plurality of glue moving grooves are evenly distributed on the glue coating roller, the glue coating roller is connected with the glue sink device and is glue immersed, the glue coating roller rotates to transfer the glue inside the glue sink device into the glue moving grooves and to coat the plating layer of the bead planting film with the glue inside the glue moving grooves.

10. The preparation method for a fancy reflective material according to claim 7, wherein a thickness of the glue layer is 30 μm-500 μm, a thickness of the plating layer is 0.1 nm-100 nm, a thickness of the focusing layer is 0.1 μm-5 μm, a range of a refractive index of the glass beads is 1.91-2.2, and a range of particle sizes of the glass beads is 20-80 μm.

11. The preparation method for a fancy reflective material according to claim 7, wherein the polyethylene composite film is selected from one of polyethylene/polyethylene terephthalate composite film and polyethylene/paper composite film.

12. The preparation method for a fancy reflective material according to claim 7, wherein the plating layer is one of a metal plating layer, a transparent plating layer, and a semitransparent plating layer.

13. The preparation method for a fancy reflective material according to claim 7, wherein the specific coating method in step 4) comprises: the bead planting film in step 3) is unwound to the composite glue coating device through a guide roller, such that the bead planting film passes through a bead planting film passing interval between the composite glue roller and the glue coating roller, the glue coating roller rotates to fill the glue moving grooves with the glue, the glue coating roller rotates to drive the glue moving groove filled with the glue to be coupled with the plating layer of the bead planting film passing the bead planting film passing interval, the glue in the glue moving groove is transferred to the bead planting film to realize glue coating coupling, thereby finishing a dynamic glue moving coupling and coating, in a rotating process of the glue coating roller, the glue scrapping device is used to scrap excessive glue on the roller surface of the glue coating roller, and a bead planting film with a fancy glue layer is formed.

14. The preparation method for a fancy reflective material according to claim 13, wherein a heating temperature range of the glue coating roller is 0° C.~150° C., the glue sink device comprises a glue sink, the glue sink is disposed below the glue coating roller and the lower roller surface of the glue coating roller is immersed in the glue of the glue sink, a heating temperature range of the glue sink is 0° C.~180° C., the glue coating roller is a fancy roller, a glue transfer quantity of the glue coating roller is 200 g/m²~250 g/m², and the glue and the plating layer have a coupling temperature of 0-140° C., a coupling pressure of 0.01 MPa-5 MPa and a coating speed of 3~30 m/min.

15. The preparation method for a fancy reflective material according to claim 14, wherein the glue coating roller is a fancy intaglio roller, a depth H of the glue moving grooves on the intaglio roller is 0.06~0.45 mm, and a glue transfer quantity of the glue moving grooves is controlled at 50%~95% according to a solid content of the glue or glue viscosity.

16. The preparation method for a fancy reflective material according to claim 13, wherein the glue scrapping device is disposed in opposite or same direction with the rotating direction of the glue coating roller, the glue scrapping device is a glue scrapping disk, a glue scrapping plate or a glue scrapping blade, a tangent plane included angle between the glue scrapping device and the roller surface of the glue coating roller is a=15±1°, and a full width line pressure of the glue scrapping device is 8~17 kg/m.

17. The preparation method for a fancy reflective material according to claim 13, wherein the composite glue coating device is connected to a composite device, a peeling part, and a winding auxiliary device through a drying path, thereby forming a composite coating system.

18. The preparation method for a fancy reflective material according to claim 13, wherein the glue of the glue layer is prepared by mixing the following components in parts by weight: 60-70 parts of a main resin, 0-9 parts of a curing agent, 0-20 parts of a flame retardant, 0-10 parts of an auxiliary, 0-30 parts of a diluent and 0-30 parts of a color filler;
wherein the main resin is selected from one or more of copolyester, copolyamide, ethylene and a copolymer thereof, ethylene acrylic copolymer, styrene and a segmented copolymer thereof, thermoplastic polyurethane hot melt adhesive, reaction type polyurethane hot melt adhesive, thermoplastic acrylate solvent type acrylic resin, solvent type polyurethane resin, waterborne acrylic resin, and waterborne polyurethane resin; the curing agent is selected from one or more of isocyanate curing agent, aziridine curing agent, and amino resin curing agent; the flame retardant is selected from one or more of phosphorus based flame retardant, nitrogen based flame retardant, phosphorus-nitrogen based flame retardant, bromine based flame retardant, and inorganic flame retardant; the auxiliary is selected from one or more of wetting agent, dispersant, coupling agent, and anti-drawing auxiliary; the diluent is selected from one or more of ethyl acetate, toluene, butanone, butyl acetate, dimethylbenzene, cyclohexanone, and water; the color filler is selected from one or more of aluminum powder, aluminum paste, color powder, color paste, calcium carbonate, kaolin, titanium dioxide, silicon dioxide and luminous powder.

19. The preparation method for a fancy reflective material according to claim 13, wherein the bead planting film with the fancy glue layer in step 5) is coupled with the substrate through a drying path at the composite device, then the polyethylene composite film is peeled at the peeling part to obtain a fancy reflective material which is wound by a winding auxiliary device.

20. The preparation method for a fancy reflective material according to claim 19, wherein the glue layer of the bead planting film with a fancy glue layer in step 5) and the substrate have a coupling temperature of 0-140° C., a coupling pressure of 0.01 MPa-5 MPa and a coating speed of 3-30 m/min.

21. A preparation method for a fancy reflective material, comprising:
1) planting glass beads: the glass beads are placed on a polyethylene composite film, and are then placed in a heating roller at a temperature of 140-220° C., along with the melting of the polyethylene composite film, the glass beads are deposited on the polyethylene composite film, after the polyethylene composite film is cooled, the glass beads are fixed on the polyethylene composite film, thereby plants the glass beads;
2) surfaces of the glass beads in step 1) are coated with a focusing coating, and then dried into a focusing layer;
3) plating: a plating medium forms a plating layer outside the focusing layer through a resistance heating manner, thereby forms a bead planting film;
4) a glue layer is roller-coated outside the plating layer in a geometric shape through a composite glue coating device, thereby forms the bead planting film with a fancy glue layer; and
5) the bead planting film with the fancy glue layer is passed through the composite coating system to obtain the fancy reflective material,
wherein the glue layer is formed with a glue prepared by mixing components as follows in parts by weight: 60-70 parts of a main resin, 0-9 parts of a curing agent, 0-20 parts of a flame retardant, 0-10 parts of an auxiliary, 0-30 parts of a diluent and 0-30 parts of a color filler, wherein:
the main resin is selected from one or more of copolyester, copolyamide, ethylene and a copolymer thereof, ethylene acrylic copolymer, styrene and a segmented copolymer thereof, thermoplastic polyurethane hot melt adhesive, reaction type polyurethane hot melt adhesive, thermoplastic acrylate solvent type acrylic resin, solvent type polyurethane resin, waterborne acrylic resin, and waterborne polyurethane resin;
the curing agent is selected from one or more of isocyanate curing agent, aziridine curing agent, and amino resin curing agent;
the flame retardant is selected from one or more of phosphorus based flame retardant, nitrogen based flame retardant, phosphorus-nitrogen based flame retardant, bromine based flame retardant, and inorganic flame retardant;
the auxiliary is selected from one or more of wetting agent, dispersant, coupling agent, and anti-drawing auxiliary;
the diluent is selected from one or more of ethyl acetate, toluene, butanone, butyl acetate, dimethylbenzene, cyclohexanone, and water; and
the color filler is selected from one or more of aluminum powder, aluminum paste, color powder, color paste, calcium carbonate, kaolin, titanium dioxide, silicon dioxide and luminous powder.

* * * * *